US010050829B2

(12) United States Patent
Huth et al.

(10) Patent No.: US 10,050,829 B2
(45) Date of Patent: Aug. 14, 2018

(54) METHOD FOR INCORPORATING A COMMUNICATION DEVICE IN A NETWORK, AND ARRANGEMENT HAVING AT LEAST ONE NETWORK FILTER COMPONENT AND AT LEAST ONE CONFIGURATION SERVER

(71) Applicant: Siemens Aktiengesellschaft, Munich (DE)

(72) Inventors: Hans-Peter Huth, Munich (DE); Matthias Scheffel, Unterhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/308,538

(22) PCT Filed: Mar. 23, 2015

(86) PCT No.: PCT/EP2015/056077
§ 371 (c)(1),
(2) Date: Nov. 2, 2016

(87) PCT Pub. No.: WO2015/176847
PCT Pub. Date: Nov. 26, 2015

(65) Prior Publication Data
US 2017/0070386 A1    Mar. 9, 2017

(30) Foreign Application Priority Data

May 22, 2014   (DE) .................... 10 2014 209 797

(51) Int. Cl.
*H04L 12/28*   (2006.01)
*H04L 12/24*   (2006.01)
*H04L 12/46*   (2006.01)

(52) U.S. Cl.
CPC ...... *H04L 41/0806* (2013.01); *H04L 12/4641* (2013.01)

(58) Field of Classification Search
CPC .................... H04L 41/0806; H04L 12/4641
See application file for complete search history.

(56) References Cited

U.S. PATENT DOCUMENTS 6,223,218 B1    4/2001   Iijima et al. .................. 709/221
2006/0050681 A1*  3/2006   Monteiro ............ H04L 12/4645
                                                        370/352

(Continued)

FOREIGN PATENT DOCUMENTS

WO    2015/176847 A1    11/2015    ............. H04L 12/24

OTHER PUBLICATIONS

International Search Report and Written Opinion, Application No. PCT/EP2015/056077, 22 pages, dated Sep. 7, 2015.

*Primary Examiner* — Afshawn M Towfighi
(74) *Attorney, Agent, or Firm* — Slayden Grubert Beard PLLC

(57) ABSTRACT

A method is provided for incorporating a communication device in a network including a set of configuration servers having at least one configuration server, and a set of productive servers having at least one productive server. The method includes (a) establishing a connection between the communication device and the network, which connection is restricted solely to a stipulated selection from the set of configuration servers; (b) obtaining configuration data from the stipulated selection of configuration servers, which stipulate access rights of the communication device to a selection from the set of productive servers; and (c) configuring the communication device using the obtained configuration data such that access by the communication device is restricted to the selection from the set of productive servers.

9 Claims, 2 Drawing Sheets

(56) References Cited

U.S. PATENT DOCUMENTS

| | | | |
|---|---|---|---|
| 2013/0132541 A1 | 5/2013 | Falk et al. | 709/222 |
| 2013/0265910 A1 | 10/2013 | Hillen et al. | 370/255 |
| 2014/0063531 A1 | 3/2014 | Deter et al. | 358/1.14 |

* cited by examiner

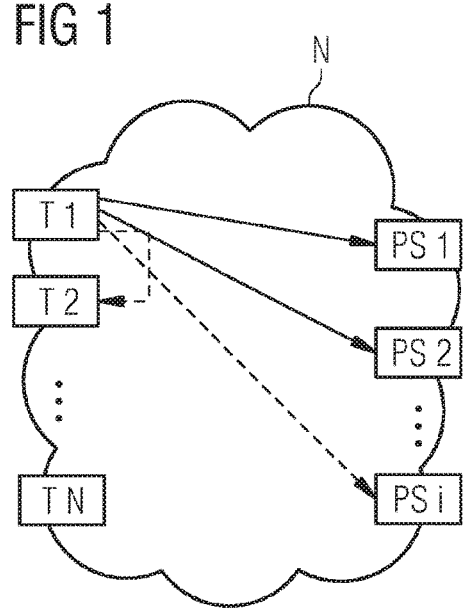
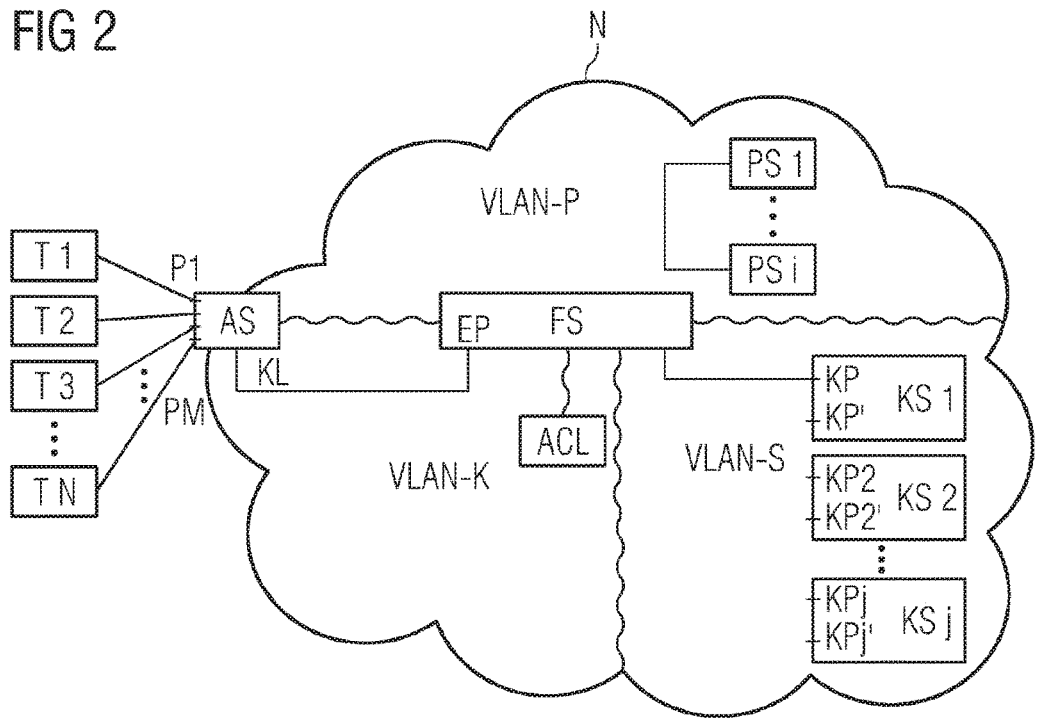

METHOD FOR INCORPORATING A COMMUNICATION DEVICE IN A NETWORK, AND ARRANGEMENT HAVING AT LEAST ONE NETWORK FILTER COMPONENT AND AT LEAST ONE CONFIGURATION SERVER

CROSS-REFERENCE TO RELATED APPLICATIONS

This application is a U.S. National Stage Application of international Application No. PCT/EP2015/056077 filed Mar. 23, 2015, which designates the United. States of America, and claims priority to DE Application No. 10 2014 209 797.5 filed May 22, 2014, the contents of which are hereby incorporated by reference in their entirety.

TECHNICAL FIELD

The invention relates to a method for incorporating a communication device in a network and to an arrangement having at least one network filter component, in particular a filter switch, and at least one configuration server.

BACKGROUND

If communication devices are intended to be operated in a network, they must first of all be configured after being switched on, that is to say, for example, the software, in particular also software for the operating system, must be adapted to the requirements of the network and/or to those of the user by selecting the suitable software components. This configuration concerns parts of the operating system, for example which IP addresses are used, where these addresses are obtained from, or which DNS (Domain Name Service) is used. Applications, for example programs or applications, on the device, in particular the terminal, for example PCs, PDAs, smartphones etc., also generally require a configuration.

Different configuration possibilities are customary and are used individually or alongside one another. These are, in particular, a configuration locally present in the terminal, an automatic configuration in which configuration data are generated by means of an algorithm, or the loading of one or more configurations from remote servers.

If a communication device is now operated in a network, an important aspect is to limit the access possibilities of the communication device in the network in order to ensure the security of the network.

SUMMARY

One embodiment provides a method for incorporating a communication device in a network having a set of configuration servers having at least one configuration server, and a set of productive servers having at least one productive server, the method including the steps of: (a) establishing a connection between the communication device and the network, which connection is restricted solely to a stipulated selection from the set of configuration servers; (b) obtaining configuration data from the stipulated selection of configuration servers, which data stipulate access rights of the communication device to a selection from the set of productive servers; and (c) configuring the communication device using the obtained configuration in such a manner that access of the communication device is restricted to the selection from the set of productive servers.

In one embodiment, a connection is established between the communication device and the network via a network access component, in particular an access switch.

In one embodiment, a network filter component, in particular a filter switch, is provided in the network and is used to access one or more network nodes.

In one embodiment, a connection request is transmitted by a communication device and, in response to this connection request, the connection which is restricted solely to a stipulated selection from the set of configuration servers is established.

In one embodiment, the network filter component after a connection has been established between the communication device and the network, is initially in a first status with respect to this communication device, in which the data which come from a communication device are passed solely to the selection of configuration servers, and after receiving data from at least one configuration server, the network filter component is changed over to a second status in which, if data are received again from the relevant communication device, these data are forwarded to at least one productive server from the selection from the set of productive servers.

In one embodiment, the network is subdivided into at least two logical sections, one of which constitutes a subnetwork for configuration and the other of which constitutes a subnetwork for productive operation.

In one embodiment, the data from the at least one configuration server stipulate the status of the network filter component and/or access rights of a communication device to one or more nodes, in particular productive servers, in the subnetwork for productive operation.

Another embodiment provides an arrangement including at least one network filter component, in particular a filter switch, which can be connected to at least one communication device and to at least one configuration server, and at least one first set of configuration servers having at least one configuration server, wherein the network filter component is configured in such a manner that a request can be transmitted to a selection from the first set of configuration servers, and configuration data can be obtained from at least one configuration server in this selection from the first set of configuration servers, which configuration data stipulate (a) whether the network filter component transmits data to at least one productive server or to at least one configuration server and (b) the access rights to one or more productive servers.

In one embodiment, the arrangement also includes a network access component, in particular an access switch, which can be used to establish a connection between at least one communication device and the at least one network filter component.

Another embodiment provides a network having an arrangement as disclosed above, wherein the arrangement is logically subdivided into at least one subnetwork for configuration and a subnetwork for productive operation and both subnetworks can be accessed by means of the network filter component.

BRIEF DESCRIPTION OF THE DRAWINGS

Example aspects and embodiments are described in detail below with reference to the drawings, in which:

FIG. 1 shows a schematic scenario relating to the configuration of access rights of communication devices to servers in a network;

FIG. 2 shows an example configuration of the invention in which one or more communication devices are connected to at least one corresponding configuration server and productive server via access using a filter switch;

DETAILED DESCRIPTION

Figure 3:
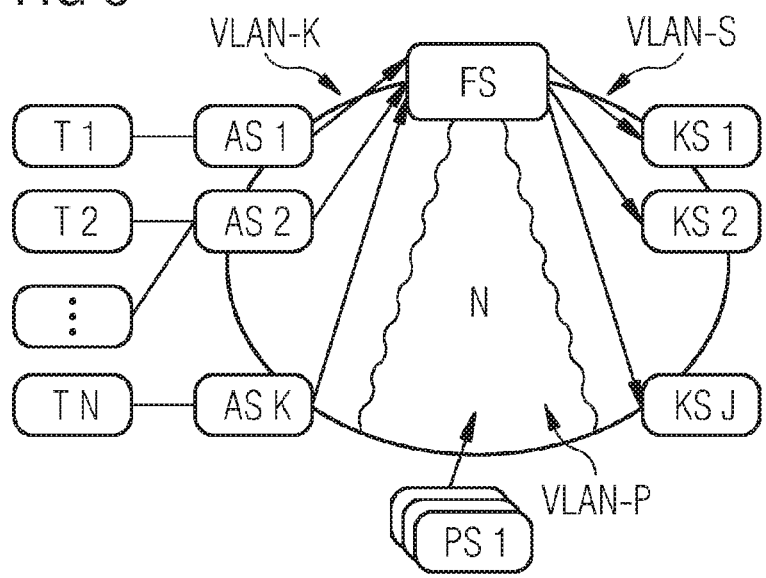
FIG. 3 shows an example configuration of the invention with a plurality of access switches.

Embodiments of the present invention provide for incorporation of a communication device in a network in such a manner that the security of the network is likewise ensured and the incorporation is carried out effectively.

According to a method, in order to incorporate a communication device in a network, only a connection to one or more configuration servers is therefore first of all allowed. Configuration data are obtained, e.g., by the communication device, from this at least one configuration server and are used, e.g., by the communication device, to carry out the configuration in such a manner that the communication device is allowed to access only at least one selected productive server.

One aspect of some embodiments is therefore to allow the communication device to initially have only one connection which makes it possible to obtain configuration data and, by means of these configuration data, to allocate access rights of the communication device for normal operation, that is to say operation after being incorporated in the network, in particular.

A set of configuration servers containing at least one configuration server is therefore provided in the network. In order to establish a connection between a communication device and the network, a connection to a selection or subset from the set of configuration servers is first of all allowed. This selection or subset can also consist of the entire set.

The selection can be stipulated, in particular, using characteristic data which relate to the communication device and are concomitantly transmitted by the latter in a request to establish a connection to the network, for example.

Configuration data are obtained, e.g., by the communication device, from at least one of these configuration servers or this configuration server. Data can therefore be obtained, in particular, from the entire selection or only from one or more configuration servers in the selection. The access rights of the communication device in the network are configured, e.g., by the communication device, using said data or data derived from the latter.

In particular, the connection to at least one configuration server can be initiated in response to a request from a communication device which wishes to establish a connection to the network. This connection can be implemented, in particular, via a network access component, for example an access switch.

In particular, a network filter component, for example a filter switch, is changed after receiving data from the at least one configuration server to the effect that it now passes data coming from the communication device to the at least one productive server which can be accessed by the communication device for the duration of this communication connection.

If the network is divided into logical sections in particular, a network filter component therefore stipulates whether data coming from the communication device are passed to a subnetwork for configuration or to a subnetwork for productive operation.

One advantage is therefore, in particular, the fact that, in an initial configuration phase in which a device newly enters a network, it is ensured that this terminal receives the correct configuration, on the one hand, and cannot effect any unauthorized access operations, on the other hand, as long as the device configuration has not been concluded.

An arrangement may have a network filter component, which can be used to establish a connection to at least one configuration server, and at least one configuration server.

The network filter component is designed in such a manner that a connection only to at least one configuration server is effected without a configuration having been carried out. In response to a request which is passed from the one network filter component to the configuration server, configuration data can be obtained, e.g., by the filter device, from the configuration server. A configuration is effected, e.g., by the filter device, using these configuration data in such a manner that the relevant communication device is only allowed access to a selection of productive servers.

FIG. 1 schematically illustrates a network N in which the communication devices T1, T2, . . . TN can be operated. The access possibility of the individual communication devices is now intended to be restricted. By way of example, access of the communication device T1 to the communication device T2 and to the productive server PSi is not allowed in FIG. 1. This is illustrated using the dashed lines. Access to other productive servers, the productive server PS1 and the productive server PS2, is intended to be allowed.

FIG. 2 illustrates an exemplary configuration of the invention with a network according to the IEEE 802.3 Ethernet standard. A first communication device T1, a second communication device T2 to an nth communication device TN are connected to an access switch AS as a network access component.

A network access component makes it possible to establish a connection to a network.

In connection with computer networks, a "switch", "changeover switch", "network switch" or "distributor" is understood as meaning, in particular, a coupling element which connects subnetworks or network segments to one another. Data are forwarded via a "switch", to be precise to the connections or ports which lead to the target node for which data are intended.

The connection between a communication device T1, T2, . . . TN can respectively be implemented in a wireless or wired manner. A communication device T1, T2, . . . TN can transmit data to a configuration server, for example configuration requests which are used to find DNS (Domain Name Service) servers.

The access switch AS makes it possible to access the network N, that is to say, in particular, the subnetwork for productive operation VLAN-P and the subnetwork for configuration VLAN-K.

FIG. 2 illustrates, by way of example, an embodiment having only one access switch AS. Alternatively, a plurality of access switches may be provided in order to increase the scalability of the network, for example. Each communication device T1, T2, . . . TN is optionally connected or can be connected to one or a plurality of access switches AS.

In a first initial state, the access switch AS transmits data from at least one communication device T1, T2, . . . TN to a filter switch FS in the subnetwork for configuration VLAN-K.

The access switch AS optionally has the possibility of connecting a plurality of terminals to different ports P1, P2, . . . PM. In this case, internal filter rules are implemented in the access switch AS, which filter rules prevent cross-traffic in the access switch AS, that is to say, for example, a connection from the communication device T1 to the communication device T2 is effected directly via the access switch AS. In this case, a number M of ports P1, P2, . . . PM may be provided, where M may be greater than, less than or equal to the number N of terminals T1, T2, . . . TN.

Alternatively or additionally, provision is made for at least two, more or all communication devices T1, T2, . . . TN to be connected or to be able to be connected to a port.

According to one configuration, the access switch AS has a plurality of ports P1, P2, . . . PM at which one or more communication devices T1, T2, . . . TN can each be connected to the access switch AS.

The access switch AS forwards data coming from communication devices T1, T2, . . . TN to the filter switch FS using a connection KL via the subnetwork for configuration VLAN-K. The access switch AS also receives predefined settings from a configuration server KS via the filter switch FS. In the network N, the filter switch FS is incorporated in such a manner that there is access both to the subnetwork for configuration VLAN-K and to the subnetwork for productive operation VLAN-P.

FIG. 2 illustrates, by way of example, an embodiment having a filter switch FS as a network filter component. Alternatively, a plurality of filter switches may be provided, which filter switches optionally also still have access to further regions of the network N.

Data can be passed to particular destinations via a network filter component, in particular also using rules available to the component.

The filter switch has a communication or terminal port EP via which data, for example data packets, are passed from a communication device T1, T2, . . . TN solely to a configuration port KP of the configuration server KS.

According to another configuration, a plurality of terminal ports are provided, to each of which one or more communication devices T1, T2, . . . TN can be connected via one or more access switches AS.

FIG. 2 illustrates, by way of example, a configuration server KS1 having a configuration port KP and a configuration port KP'. Alternatively, only one configuration port KP or any desired plurality of configuration ports KP can be provided.

An access control list ACL is used to stipulate that data which come from one of the input ports EP are passed to a particular configuration server KS1, KS2, . . . KSj and in turn to a stipulated configuration port KP, KP' or KP2, KP2', etc. of the configuration server KS1 or KS2, etc.

With the aid of the data for configuring a particular terminal from a configuration server KS1, KS2, . . . KSj, settings at the access switch AS are changed (e.g., by the access switch) to the effect that data from the relevant communication device T1, T2, . . . TN are now transmitted to the filter switch FS in the subnetwork for productive operation VLAN-P.

Alternatively or additionally, a change in the settings at the access switch is triggered by receiving data (e.g., at the access switch) from at least one configuration server.

The access control list ACL is also used at the filter switch FS to stipulate which of the productive servers PS1, PS2, PSi can be accessed by the relevant communication device T1, T2, . . . TN.

FIG. 3 shows an exemplary configuration of a network as standard Ethernet which is logically subdivided into three sections, a subnetwork for configuration VLAN-K, a subnetwork VLAN-S in which the configuration servers KS1, KS2, . . . KSN are organized, and a subnetwork VLAN-P for the productive area, to which productive servers PS1, PS2, . . . PSJ are assigned. This division into three parts further increases the robustness of the network with respect to attacks since a new communication device initially only has access to the access switch AS assigned to it.

According to the configuration shown in FIG. 3, a plurality of access switches AS are provided and are each assigned to one or more terminals T1, T2, . . . TN.

Alternatively, provision may also be made for a plurality of access switches AS to be assigned to a communication device T1, T2, . . . TN. The utilization of the access switches can therefore be better controlled, for example. Furthermore, both a communication device T1, T2, . . . TN can be assigned to a plurality of access switches AS and an access switch AS can be assigned to a plurality of communication devices T1, T2, . . . TN.

Figure 4:
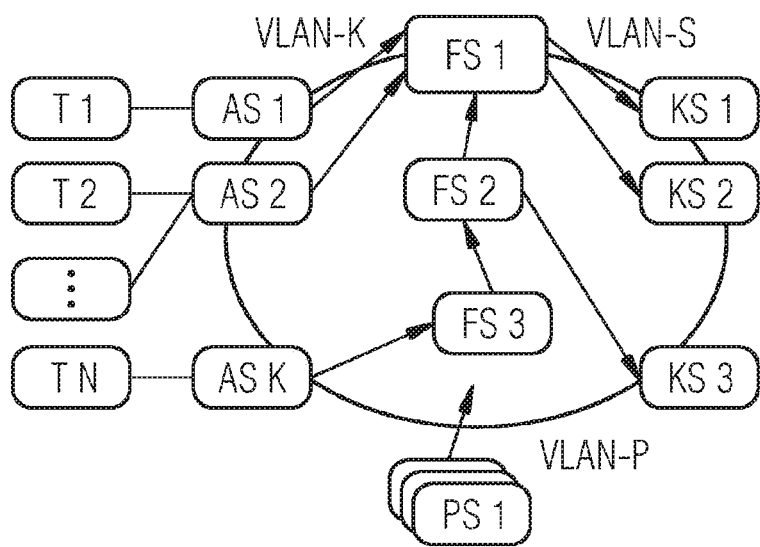
FIG. 4 shows an example configuration of the invention with a plurality of access switches and filter switches.

FIG. 4 shows a further exemplary configuration in which the network has likewise been logically divided into three parts and a plurality of access switches AS1, AS2, . . . ASK are provided. In addition, three filter switches FS1, FS2, FS3 are provided. The use of a group of filter switches increases the scalability of the system, that is to say a greater number of communication devices can be connected to a greater number of configuration servers and productive servers in each case.

Instead of three filter switches, any desired number of filter switches can be provided in order to take into account, for example, the size, logical division and utilization of the network.

A number of specific example configurations of the invention have been described. Further configurations with the aim of carrying out two-stage incorporation in a network in such a manner that initially only one connection to at least one server is established, from which data needed to configure the communication device in the network are obtained, and access rights for a communication connection to be subsequently set up are stipulated using these data, can also be achieved with combinations of the configurations cited or individual aspects thereof and modifications.

Furthermore, the invention can also be used in more complex networks. Any desired quantity of further switches and routers may therefore be present in the network. All of these elements must support a network virtualization technology, for example VLAN (IEEE 802.1Q), in order to restrict the access possibilities of communication devices in a targeted manner.

In the exemplary embodiments, the communication devices T1, T2, . . . TN were in the form of terminals. Alternatively, individual or all communication devices T1, T2, . . . .

TN may also be in the form of devices for implementing a network node, to and from which data are passed.

What is claimed is:

1. A method for incorporating a communication device in a network having a set of configuration servers having at least one configuration server and a set of productive servers having at least one productive server, the method including:
   a) establishing a connection between the communication device and the network, which connection is restricted solely to a stipulated selection from the set of configuration servers by a network filter switch operating in a first status;
   b) obtaining, by the communication device, configuration data from the stipulated selection of the configuration servers, which configuration data stipulate access rights of the communication device to a selection from the set of productive servers; and
   c) configuring, by the communication device, the communication device using the obtained configuration data such that access of the communication device is restricted to the selection from the set of productive servers by the network filter switch operating in a second status.

2. The method of claim 1, comprising establishing a connection between the communication device and the network via an access switch.

3. The method of claim 1, comprising:
establishing the connection, which is restricted solely to the stipulated selection from the set of configuration servers, in response to a connection request transmitted by a communication device.

4. The method of claim 1, wherein:
the network filter switch, after the connection has been established between the communication device and the network, is initially in the first status in which data received from the communication device are passed solely to the selection of the configuration servers, and
after receiving data from at least one configuration server, the network filter switch is changed to the second status in which data from the relevant communication device data are forwarded to at least one productive server from the selection from the set of productive servers.

5. The method of claim 1, wherein the network is subdivided into at least two logical sections, including (a) a subnetwork for configuration and (b) a subnetwork for productive operation.

6. The method of claim 5, wherein the data from the at least one configuration server stipulate at least one of the status of the network filter switch or access rights of a communication device to one or more productive servers in the subnetwork for productive operation.

7. An arrangement, comprising:
at least one network filter switch connected to at least one communication device and to at least one configuration server, and
at least one first set of configuration servers having at least one configuration server,
wherein the network filter switch is configured to:
forward a request to one or more selected configuration servers of the first set of configuration servers while the network filter switch operates in a first status restricting connection from the at least one communication device to the one or more configuration servers, and
obtain configuration data from at least one of the selected configuration servers, which configuration data stipulate:
whether the network filter component transmits data to at least one productive server or to at least one configuration server, and
access rights to one or more productive servers,
wherein the network filter switch restricts access from the at least one communication device to one or more productive servers by operating in a second status based on the configuration data.

8. The arrangement of claim 7, further comprising a network access switch configured to establish a connection between at least one communication device and the at least one network filter switch.

9. A network comprising:
at least one network filter switch connected to at least one communication device and to at least one configuration server, and
at least one first set of configuration servers having at least one configuration server,
wherein the network filter switch is configured to:
forward a request from the at least one communication device to one or more selected configuration servers of the first set of configuration servers while operating in a first status,
obtain configuration data from at least one of the selected configuration servers, which configuration data stipulate whether the network filter component transmits data from the at least one communication device to at least one productive server or to at least one configuration server, and access rights to one or more productive servers, and
if the configuration data includes access rights, operate in a second status restricting connection of the at least one communication device to the one or more productive servers,
wherein the arrangement is logically subdivided into at least one subnetwork for configuration and a subnetwork for productive operation, wherein both subnetworks are accessible by the network filter component.

* * * * *